US 6,584,757 B2

(12) United States Patent
Komorida et al.

(10) Patent No.: US 6,584,757 B2
(45) Date of Patent: Jul. 1, 2003

(54) MOWING MACHINE WITH DUMPING GRASS CATCHER

(75) Inventors: Takeshi Komorida, Sakai (JP); Takashi Fujii, Sakai (JP); Nobuyuki Yamashita, Izumi (JP); Yoshio Tomiyama, Osaka (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/925,840

(22) Filed: Aug. 8, 2001

(65) Prior Publication Data

US 2002/0083696 A1 Jul. 4, 2002

(30) Foreign Application Priority Data

Sep. 19, 2000 (JP) ........................................ 2000-284201

(51) Int. Cl.⁷ .............................................. A01D 43/06
(52) U.S. Cl. ........................................ 56/202; 56/11.3
(58) Field of Search ................................ 56/10.8, 11.3, 56/12.8, 13.3, 14.7, 16.4 R, 16.6, 16.7, 16.8, 202, 203, 205, 206, DIG. 6, DIG. 15

(56) References Cited

U.S. PATENT DOCUMENTS

| | | | | |
|---|---|---|---|---|
| 3,568,421 A | * | 3/1971 | Smith et al. | 56/202 |
| 3,969,875 A | * | 7/1976 | Nofel | 56/DIG. 15 |
| 3,971,198 A | * | 7/1976 | Lane | 56/16.6 |
| 4,043,102 A | * | 8/1977 | Uhlinger et al. | 56/17.4 |
| 4,244,160 A | * | 1/1981 | Carolan | 56/202 |
| 4,345,418 A | * | 8/1982 | Arizpe | 56/202 |
| 4,782,650 A | * | 11/1988 | Walker | 56/16.6 |
| 4,964,266 A | * | 10/1990 | Kolb | 56/16.6 |
| 4,981,011 A | * | 1/1991 | Olejak | 56/DIG. 15 |
| 5,605,033 A | * | 2/1997 | Olmr | 56/16.6 |
| 5,832,708 A | * | 11/1998 | Sugden | 56/16.6 |
| 6,038,843 A | * | 3/2000 | Sebben et al. | 56/202 |
| 6,050,072 A | * | 4/2000 | Chabrier et al. | 56/16.6 |
| 6,220,109 B1 | * | 4/2001 | Fischer et al. | 74/337.5 |

FOREIGN PATENT DOCUMENTS

JP             50716         2/2000

* cited by examiner

Primary Examiner—Robert E. Pezzuto
Assistant Examiner—Nathan Mammen
(74) Attorney, Agent, or Firm—Webb Ziesenhiem Logsdon Orkin & Hanson P.C.

(57) ABSTRACT

A mowing machine includes a vehicle body (1), a mower unit (4) connected to and supported by the vehicle body and having flow generating members driven by power supplied thereto for generating grass carrier air flows, a grass catcher (6) disposed at a rear end of the vehicle body and defining an opening for receiving grass clippings, a grass transport duct (17) for guiding grass clippings transported by the carrier air flows to the grass catcher, and a moving mechanism (5) for moving the grass catcher between a collecting position for connecting the grass catcher to the grass transport duct and a discharge position for separating the grass catcher from the grass transport duct. A power cutoff mechanism (11, 100) is provided for stopping power supply to the mower unit in response to a movement caused by the moving mechanism of the grass catcher from the collecting position to the discharge position.

7 Claims, 10 Drawing Sheets

MOWING MACHINE WITH DUMPING GRASS CATCHER

BACKGROUND OF THE INVENTION

1. Field of the Invention

This invention relates to a mowing machine including a vehicle body, a mower unit connected to and supported by the vehicle body and having flow generating members driven by power supplied thereto for generating grass carrier air flows, a grass catcher disposed at the rear of the vehicle body and defining an opening for receiving grass clippings, a grass transport duct for guiding grass clippings transported by the carrier air flows to the grass catcher, and a moving mechanism for moving the grass catcher between a collecting position for connecting the grass catcher to the grass transport duct and a discharge position for separating the grass catcher from the grass transport duct.

2. Description of the Related Art

A known mowing machine, as disclosed in Japanese patent laying-open publication No. 2000-50716 for example, has a mower unit connected under a vehicle body, and a grass catcher attached to the rear of the vehicle body for collecting grass clippings airborne from the mower unit. This grass catcher is switchable between a collecting position connected to a grass transport duct and a discharge position separated from the duct.

In the mowing machine having the above construction, the grass catcher, when full, is switched to the discharge position to discharge grass clippings collected in the grass catcher. When the blades in the mower unit continue to be driven in this state, air flows caused by rotation of the blades vigorously blow and scatter grass clippings and soil remaining in the mower unit, or dust adhering to inner walls of the duct, from the duct that opens rearward. This could contaminate the environment.

Further, the mower unit could be driven inadvertently with the grass catcher detached for maintenance. This also results in dust on inner deck walls of the mower unit and inner walls of the duct being scattered from the duct.

SUMMARY OF THE INVENTION

This invention has been made having regard to the state of the art noted above, and its object is to provide a mowing machine for operating in a sanitary way by avoiding blowing-off of dust and the like from a duct when, for example, a grass catcher is switched to a discharge position.

The above object is fulfilled, according to this invention, by a mowing machine of the type noted in the outset hereof and comprising a power cutoff mechanism for stopping power supply to the mower unit in response to a movement caused by the moving mechanism of the grass catcher from the collecting position to the discharge position.

With the above construction, when switching the filled grass catcher to the discharge position to discharge grass clippings collected therein, the mower unit may be left in a driven state. Even so, the power cutoff mechanism acts in response to the movement of the grass catcher to the discharge position, to stop power supply to the mower unit. As a result, dust is not blown from the mower unit out through the duct.

As the device for stopping the mower unit automatically may utilize a construction for automatically disengaging an implement-operating clutch disposed in a transmission line to the mower unit, or a construction for automatically stopping the engine on the vehicle body.

The above mowing machine according to this invention can operate in a sanitary way by precluding blowing-off of dust and the like from a duct, which would contaminate the environment, when discharging grass clippings collected.

In a preferred embodiment of this invention, the power cutoff mechanism includes a detecting lever pivotable with the movement of the grass catcher from the collecting position to the discharge position, the power supply to the mower unit being stopped in response to pivoting of the detecting lever. By selecting an optimal shape for the detecting lever, the movement of the grass catcher may be converted into an optimal control displacement for the power cutoff mechanism.

In another preferred embodiment of this invention, the moving mechanism comprises a link mechanism, and the power cutoff mechanism includes a displacement producing member for producing a control displacement in response to a displacement of the link mechansim, the power supply to the mower unit being stopped by utilizing the control displacement.

With the above construction, when switching the filled grass catcher to the discharge position to discharge grass clippings collected therein, the mower unit may be left in a driven state. Even so, as the link mechansim moves to move the grass catcher to the discharge position, this movement is converted into a control displacement to actuate the power cutoff mechanism to stop power supply to the mower unit.

Other features and advantages of this invention will be apparent from the following description of the embodiments to be taken with reference to the drawings.

DESCRIPTION OF THE PREFERRED EMBODIMENTS

Figure 1:
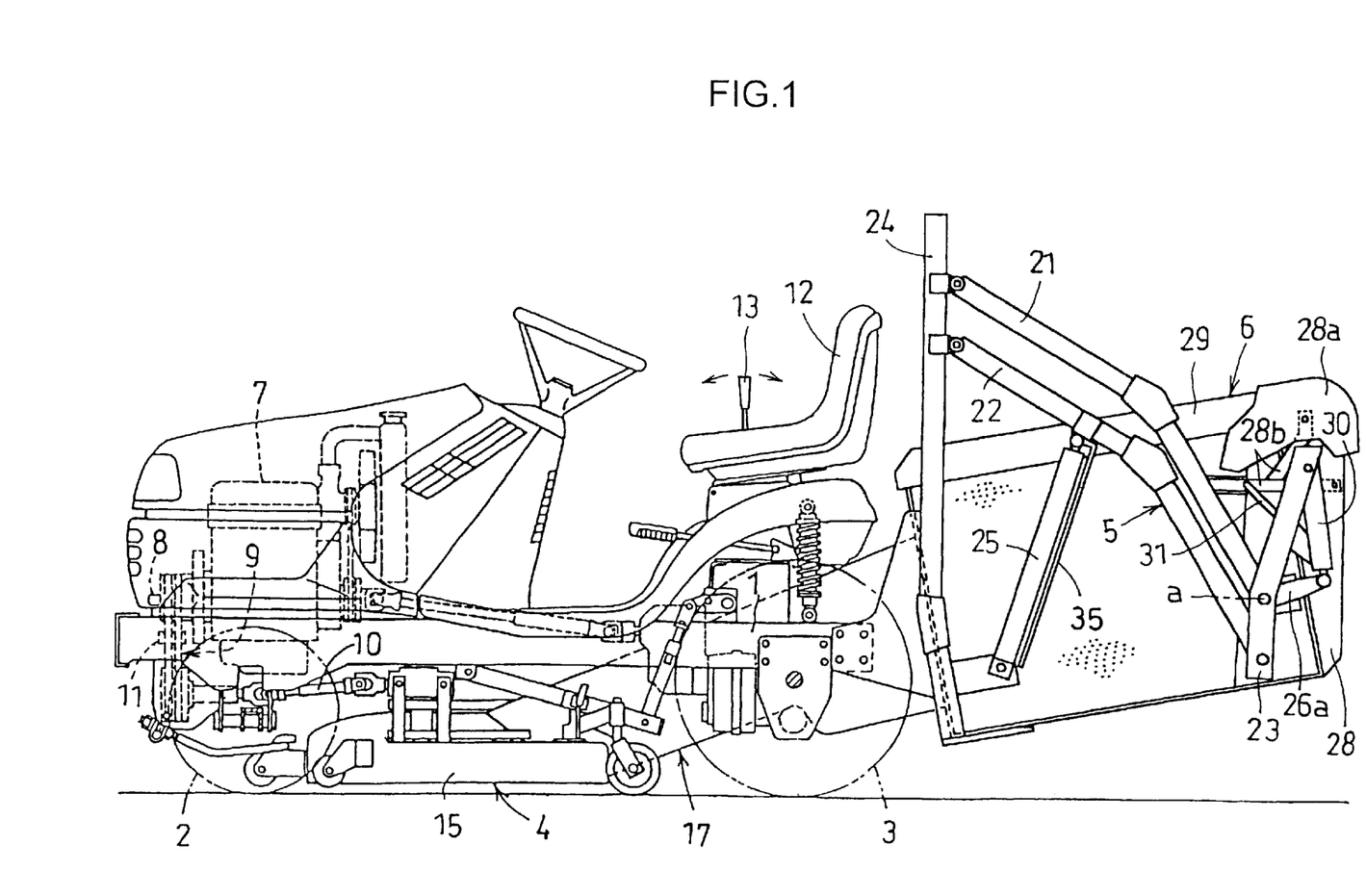
FIG. 1 is a side elevation of a mowing machine according to this invention.

FIG. 1 shows a riding type mowing machine which is one example of mowing machines according to this invention. This mowing machine includes a riding type vehicle body 1 with front wheels 2 and rear wheels 3, a mower unit 4 vertically movably suspended from the vehicle body 1 between the front wheels 2 and rear wheels 3, and a grass catcher 6 connected to the rear of vehicle body 1 to be vertically movable through parallelogram link mechanisms 5 acting as a grass catcher moving mechanism.

An engine 7 is mounted on the front of vehicle body 1. Drive taken from a front output shaft 8 of this engine 7 is transmitted through a belt transmission device 9 to a power takeoff shaft 10 disposed below the front of vehicle body 1. The drive is then transmitted from the power takeoff shaft 10 through another shaft to the mower unit 4. The belt transmission device 9 includes an implement-operating clutch 11 in the form of a tension clutch. The implement-operating clutch 11 is interlocked by wiring to a dutch control lever 13 disposed to the right of a driver's seat 12 on the vehicle body 1. The clutch control lever 13 is operable forward for "clutch engagement" and rear ward for "clutch disengagement".

Figure 2:
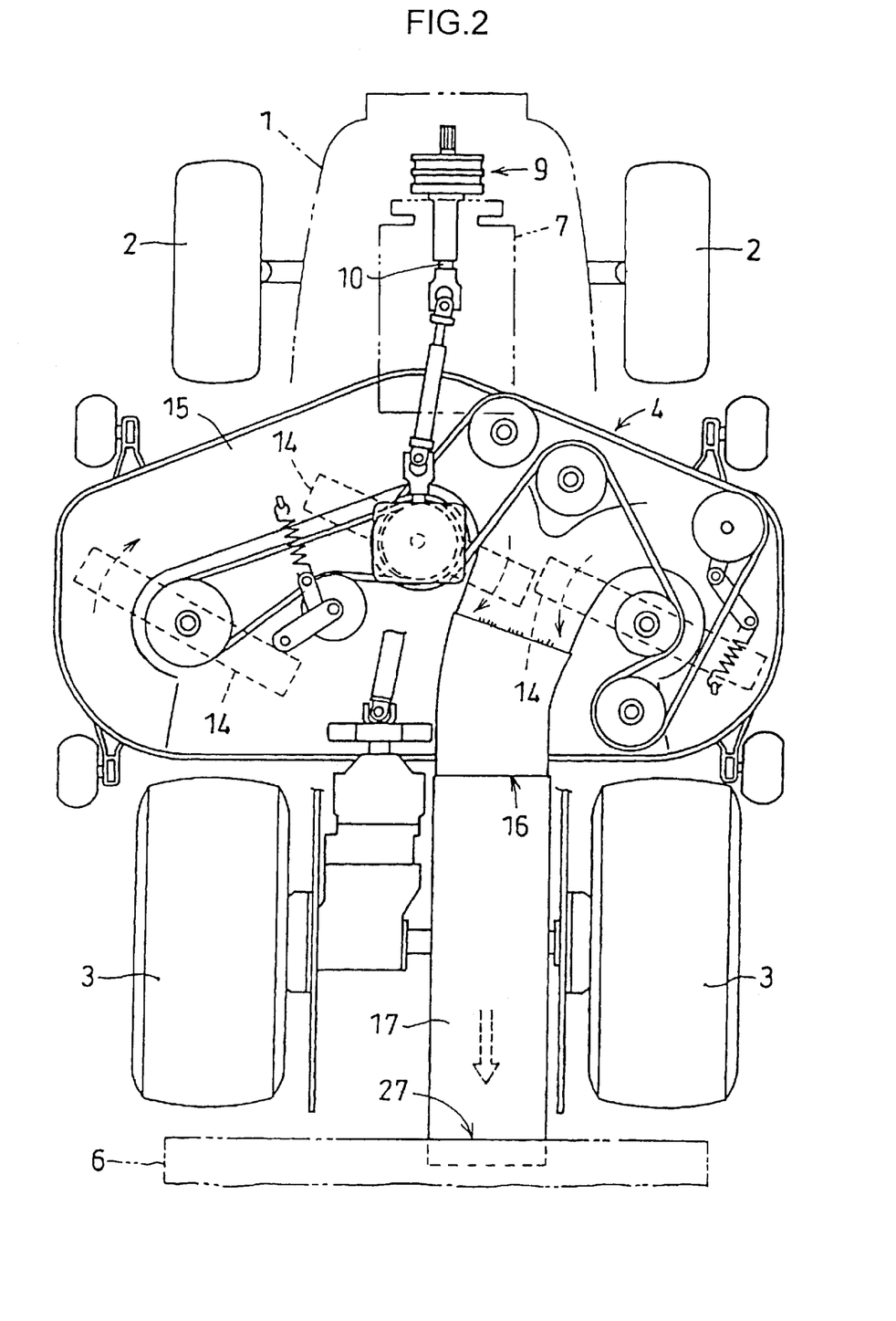
FIG. 2 is a plan view of a mower unit.

As shown in FIG. 2, the mower unit 4 includes three rotary blades 14 juxtaposed right and left in a deck 15. By the drive supplied through the power takeoff shaft 10, the two left rotary blades 14 are rotated clockwise while the right rotary blade 14 is rotated counterclockwise. These blades 14 are designed to act as air flow generating members which, when rotated, produce grass carrier air flows moving toward a duct 17. With this construction, grass clippings are entrained by the carrier air flows generated by the blades 14 in rotation, to be discharged from an exit 16 formed in the vicinity of a rear center position of the deck 15. The grass clippings are then directed to the grass catcher 6 through the duct 17 extending through a space between the right and left rear wheels 3.

Figure 3:
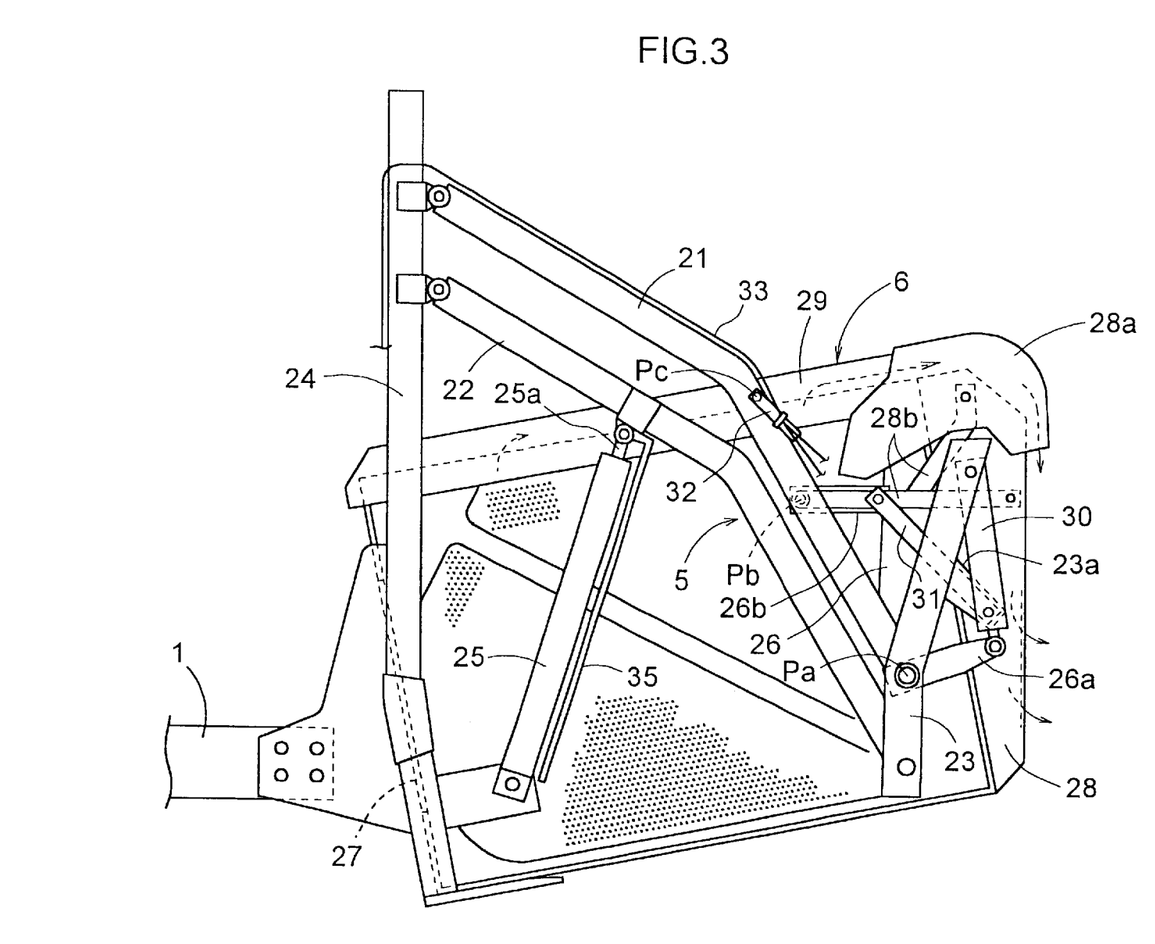
FIG. 3 is a side view of a grass catcher in a collecting position.

The link mechanisms 5 for moving the grass catcher 6 are provided as a pair of right and left mechanisms. As shown in FIG. 3, each such mechanism 5 includes an upper link 21, a lower link 22, and a vertical link 23 interconnecting rear ends of the upper link 21 and lower link 22. Each link mechanism 5 is connected to an upper portion of a support frame 24 fixed to the rear of vehicle body 1. Each link mechanism 5 is vertically movable in parallel by an extension and contraction of a hydraulic cylinder 25 mounted between a lower position of support frame 24 and the lower link 22. A guard rod 35 is disposed behind and extends parallel to the hydraulic cylinder 25 to be movable up and down with extension and contraction of the hydraulic cylinder 25. The guard rod 35 protects a piston rod 25a of hydraulic cylinder 25 from damage due to contact with other objects.

A side plate 26 disposed on a rear portion of each side surface of grass catcher 6 is pivotally connected to a point of connection Pa between the upper link 21 and vertical link 23 of each of the right and left link mechanisms 5. That is, the grass catcher 6 is supported by the link mechanisms 5 to be pivotable about the points of connection Pa.

The grass catcher 6 has a box-like configuration formed of sheet metal. An opening 27 is formed in a front plane thereof for receiving the rear end of duct 17. Substantially all of a top plane and right and left sides are formed of perforated metal or wire netting to act as vent portions. Further, the entire rear end of grass catcher 6 is open and is closed by a rear lid 28 pivotable about a point Pb. An air guide cover 29 is disposed over the top plane of grass catcher 6 for rearwardly guiding air flows passing through the upper vent portion, thereby to prevent the air flows from dispersing to the ambient.

A hydraulic cylinder 30 is mounted between a bracket 26a extending from the side plate 26 of grass catcher 6, and the vertical link 23 of link mechanism 5. By contraction of this hydraulic cylinder 30, the grass catcher 6 is swung to a level, grass collecting posture (FIG. 3). By extension of the hydraulic cylinder 30, the grass catcher 6 is tilted rearwardly to a discharge (dump) posture with the rear end facing down.

The rear lid 28 has only the lower half thereof formed of perforated metal or metal netting to act as a vent portion. Thus, the upper half of rear lid 28 stops grass clippings shooting out of the duct 17 into the grass catcher 6, and guides the grass clippings downward. The rear lid 28 has an air guide 28a formed in an upper rearward position thereof for downwardly guiding grass carrier air flows rearwardly guided by the air guide cover 29 when the rear lid 28 is in a position to close the grass catcher 6. With pivotal movements of the grass catcher 6, the rear lid 28 automatically opens and closes as described hereinafter.

Figure 4:
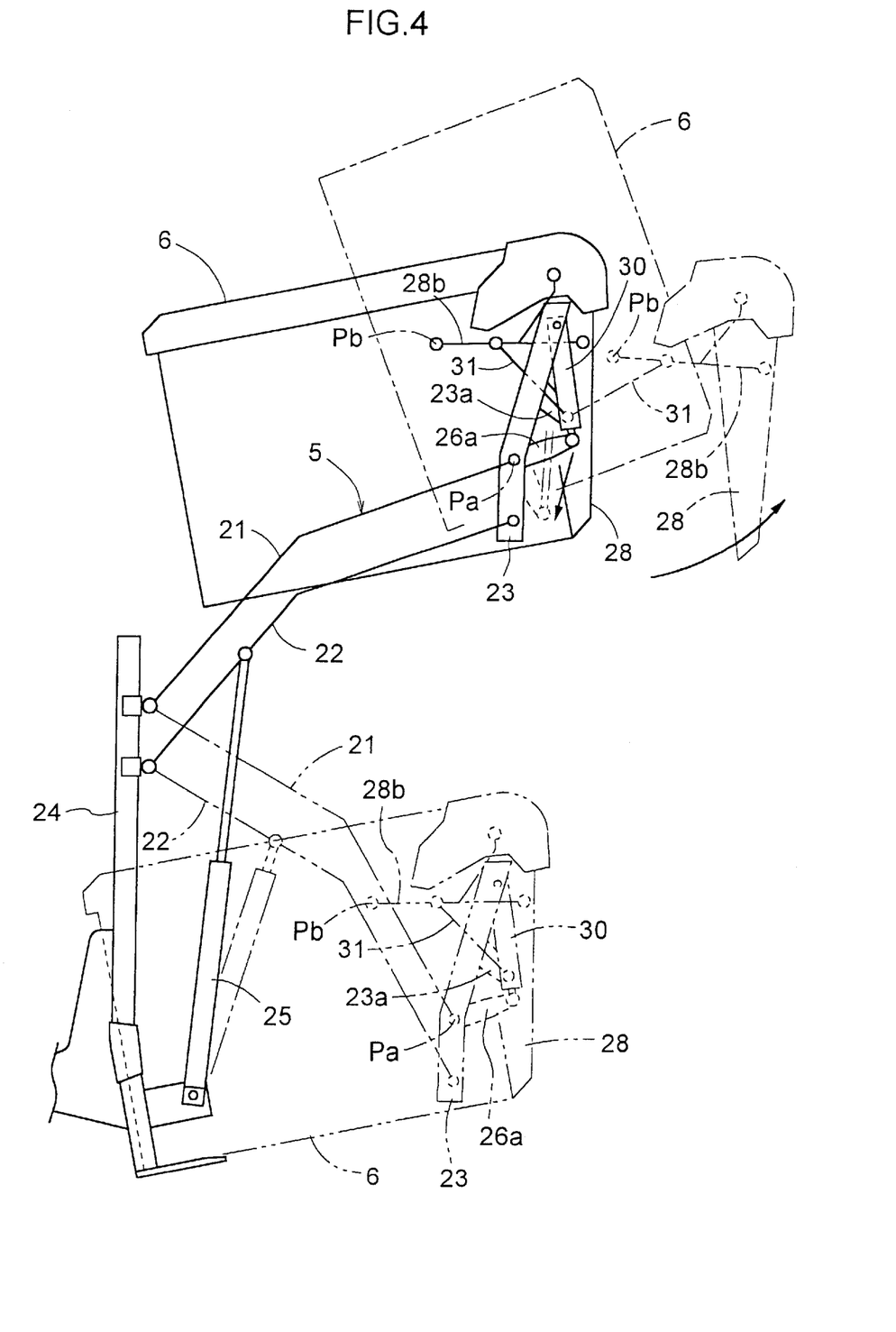
FIG. 4 is a side view showing a position changing operation of the grass catcher.

The rear lid 28 has a support arm 28b extending therefrom and having an extreme end connected to a bracket 26b extending from the side plate 26 of grass catcher 6, to be pivotable about the point Pb. A connecting link 31 extends between an intermediate position of the support arm 28b and a support portion 23a projecting from the vertical link 23. When the grass catcher 6 is in the collecting position extending fore and aft as shown in FIG. 3, the rear lid 28 is in the closing position. When the grass catcher 6 is swung to the discharge position as shown in FIG. 4, the movement of point Pb thrusts up the connecting link 31 to open the rear lid 28.

A hose support arm 32 is attached to an intermediate position of each upper link 21 to be vertically pivotable about a point Pc. A hydraulic hose 33 connected to the hydraulic cylinder 30 is tied in an intermediate position thereof to a free end of the hose support arm 32. By supporting the intermediate position of hydraulic hose 33 with the pivotable hose support arm 32 as noted above, the hydraulic hose 33 is restrained from swinging sideways and hanging downward. Thus, the hydraulic hose 33 is protected from damage due to excessive bending or pinching between link mechanism 5 and grass catcher 6.

This mowing machine has a device, which will be described hereinafter, for preventing grass clippings and the like from being inadvertently discharged from the duct 17 when the grass catcher 6 is disconnected from the duct 17.

Figure 5:
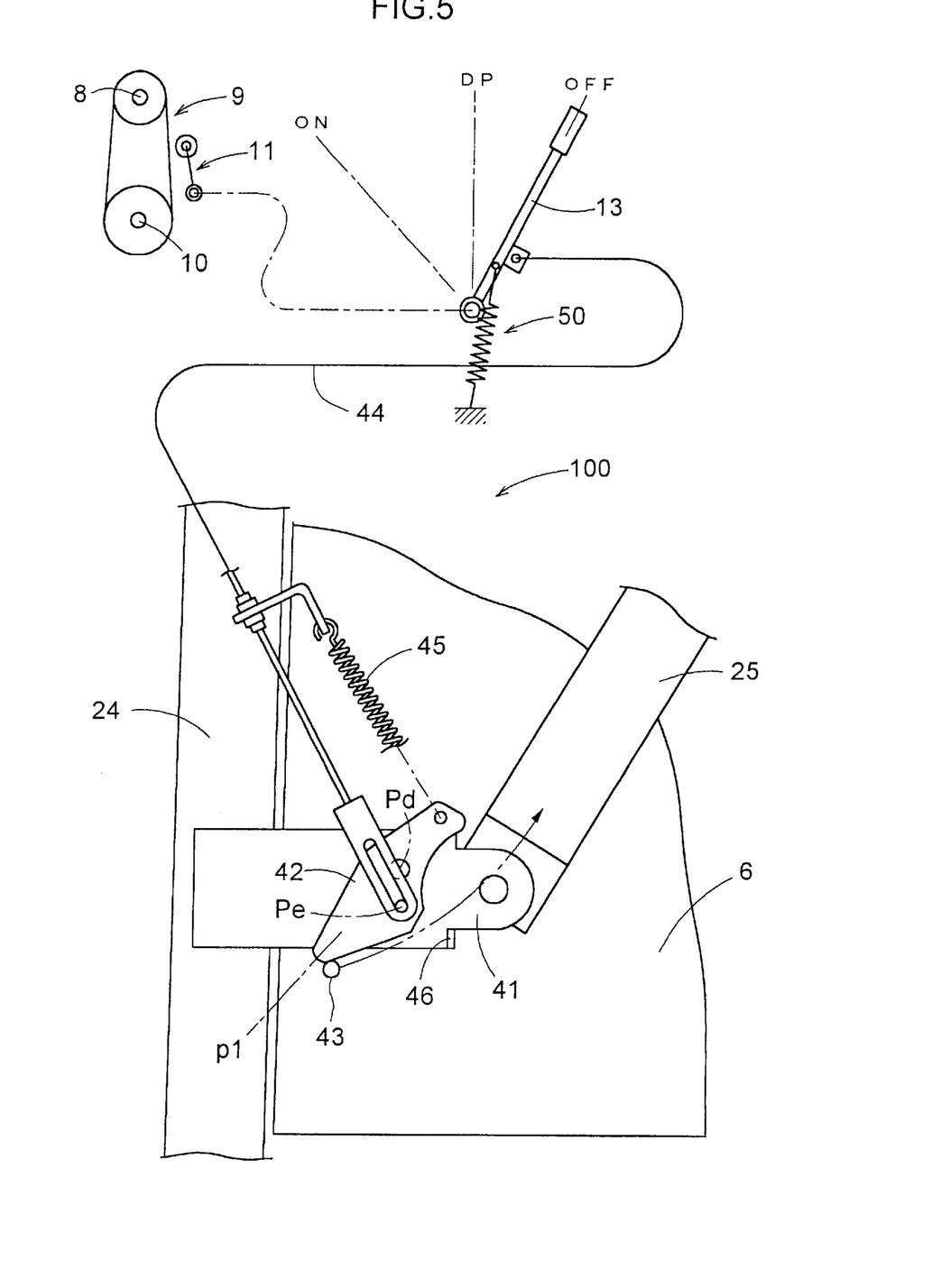
FIG. 5 is a side view showing the grass catcher in the collecting position, and a power cutoff mechanism in a clutch disengaging position.
Figure 6:
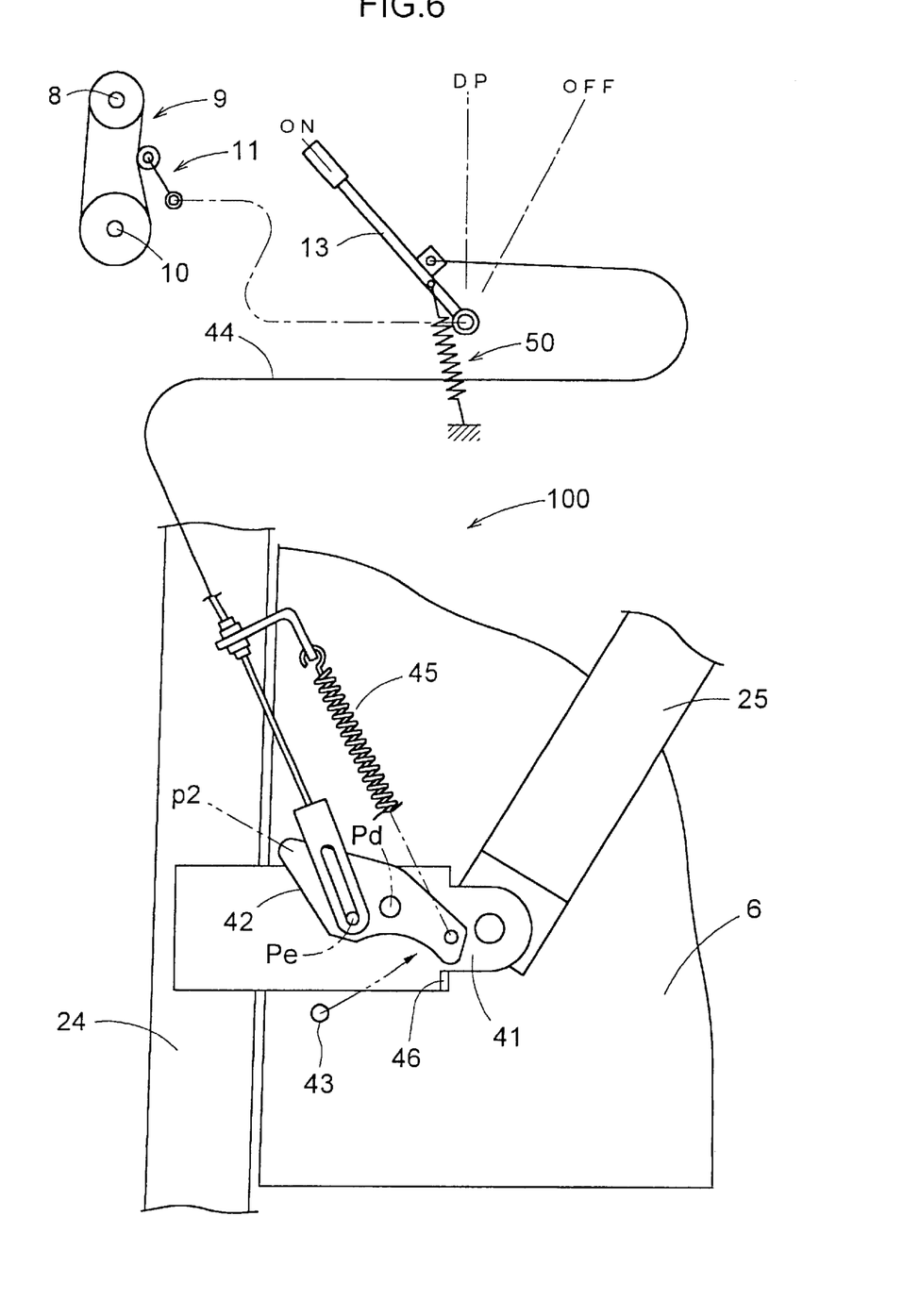
FIG. 6 is a side view showing the grass catcher in the collecting position, and the power cutoff mechanism in a clutch engaging position.
Figure 7:
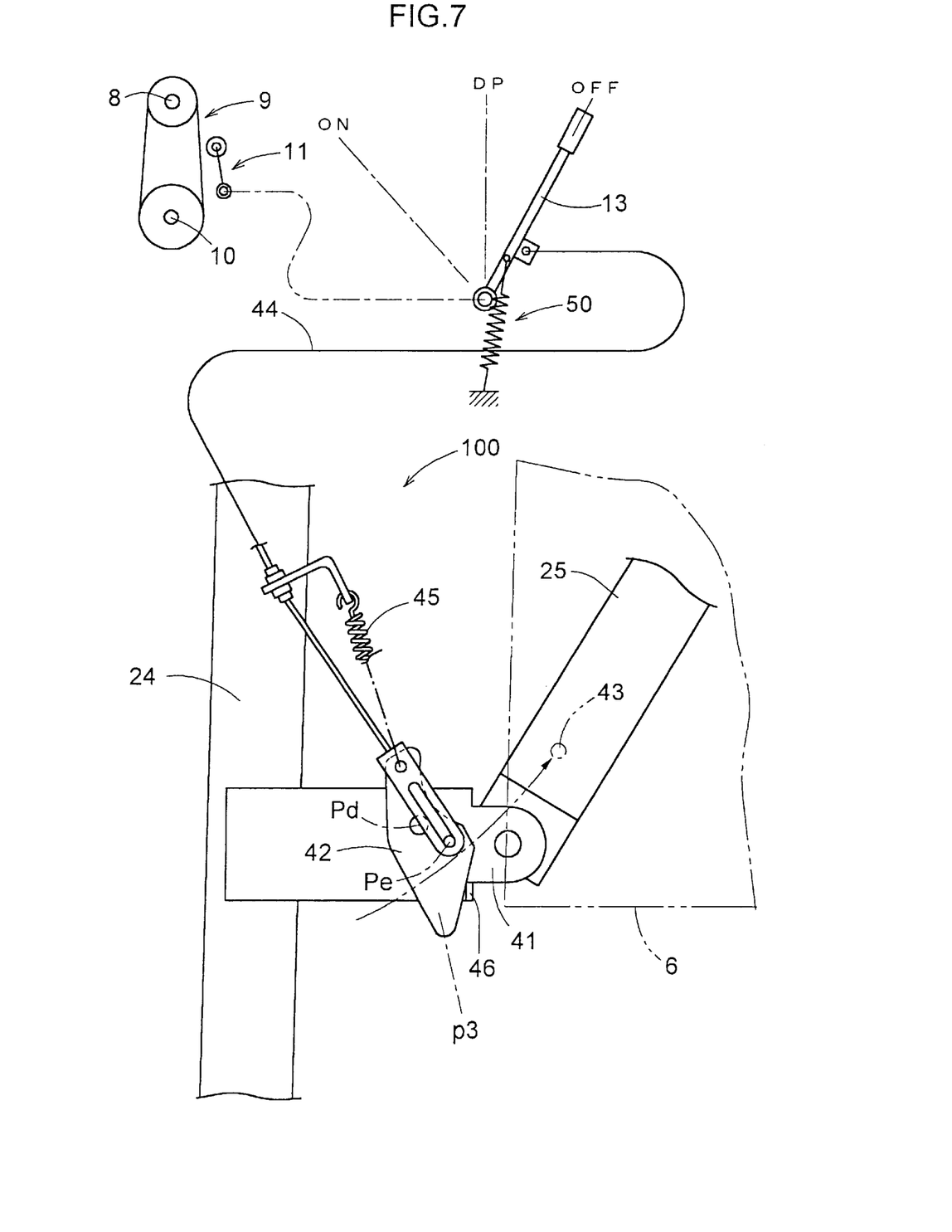
FIG. 7 is a side view showing the power cutoff mechanism in time of the grass catcher being displaced from the collecting position.

A power cutoff mechanism 100 for stopping power supply to the mower unit 4 when the link mechanisms 5 move the grass catcher 6 from the collecting position to the discharge position will be described next. As shown in FIGS. 5 through 7, the support frame 24 has a bracket 41 fixed to a lower position thereof for supporting the lower end of the hydraulic cylinder 25 that moves the link mechanisms 5 up and down. A detecting lever 42 is attached to the bracket 41 to be pivotable about a point Pd. A contact pin 43 projects from a forward position on a side surface of grass catcher 6 for contacting the detecting lever 42. The detecting lever 42 is operatively connected to the implement-operating clutch control lever 13 through a check wire 44, and constantly biased by a spring 45 counterclockwise in the drawings. When the implement-operating clutch control lever 13 is in a "clutch disengaging position" as shown in FIG. 5, the check wire 44 is relaxed, and the detecting lever 42 biased by the spring 45 is maintained in an intermediate pivoting position p1 received and supported by the contact pin 43 of the grass catcher 6 in the collecting position. When the implement-operating clutch control lever 13 is moved to a "clutch engaging position" as shown in FIG. 6, the check wire 44 is pulled, and the detecting lever 42 is swung clockwise against the spring 45 to be maintained in a detecting position p2.

The detecting lever 42 in the intermediate pivoting position p1 is slightly swung clockwise by contact with the contact pin 43 when the grass catcher 6 moves upward from the collecting position toward the discharge position with a raising operation of link mechanisms 5. At this time, no operating force occurs with the check wire 44 in the relaxed state. The detecting lever 42 in the detecting position p2 lies in a moving track of the contact pin 43. When, in this state, the grass catcher 6 moves from the collecting position toward the discharge position, the contact pin 43 contacts the detecting lever 42 and swings it counterclockwise. As a result, the check wire 44 is pulled to move the implement-operating clutch control lever 13 forcibly from the "clutch engaging position" to the "clutch disengaging position". That is, the check wire 44 acts as a main element of a displacement producing member for producing a control displacement in response to movement of the link mechanisms.

A dead point DP of a spring type toggle mechanism 50 is set to a middle position in an operating range of the implement-operating clutch control lever 13. The clutch control lever 13 in the "clutch disengaging position" OFF is biased to that position by the toggle mechanism 50. Thus, the clutch control lever 13 is maintained in the "clutch disengaging position" OFF even when the grass catcher 6 is lowered back to the collecting position.

When the grass catcher 6 is moved up to the discharge position with the contact pin 43 moved off the detecting lever 42 as shown in FIG. 7, the detecting lever 42 biased counterclockwise by the spring 45 is swung to and maintained in a standby position p3 received by a stopper 46. When, in this state, the grass catcher 6 is moved back to the collecting position, the contact pin 43 contacts the detecting lever 42 and swings it clockwise. As a result, the detecting lever 42 is returned to the intermediate pivoting position p1 shown in FIG. 5.

When the grass catcher 6 is moved to the discharge position or when the grass catcher 6 is detached from the link mechanisms 5 for maintenance or the like, the contact pin 43 is disengaged from the detecting lever 42 as noted above, and the detecting lever 42 is swung to the standby position p3. In this case, a wire connecting point Pe of detecting lever 42 moves past the point Pd, making it impossible to pull the check wire 44 from the implement-operating clutch control lever 13. That is, when the grass catcher 6 is moved to the discharge position or detached from the link mechanisms 5, the implement-operating clutch control lever 13 is prevented from moving from the "clutch disengaging position" to the "clutch engaging position".

Figure 8:
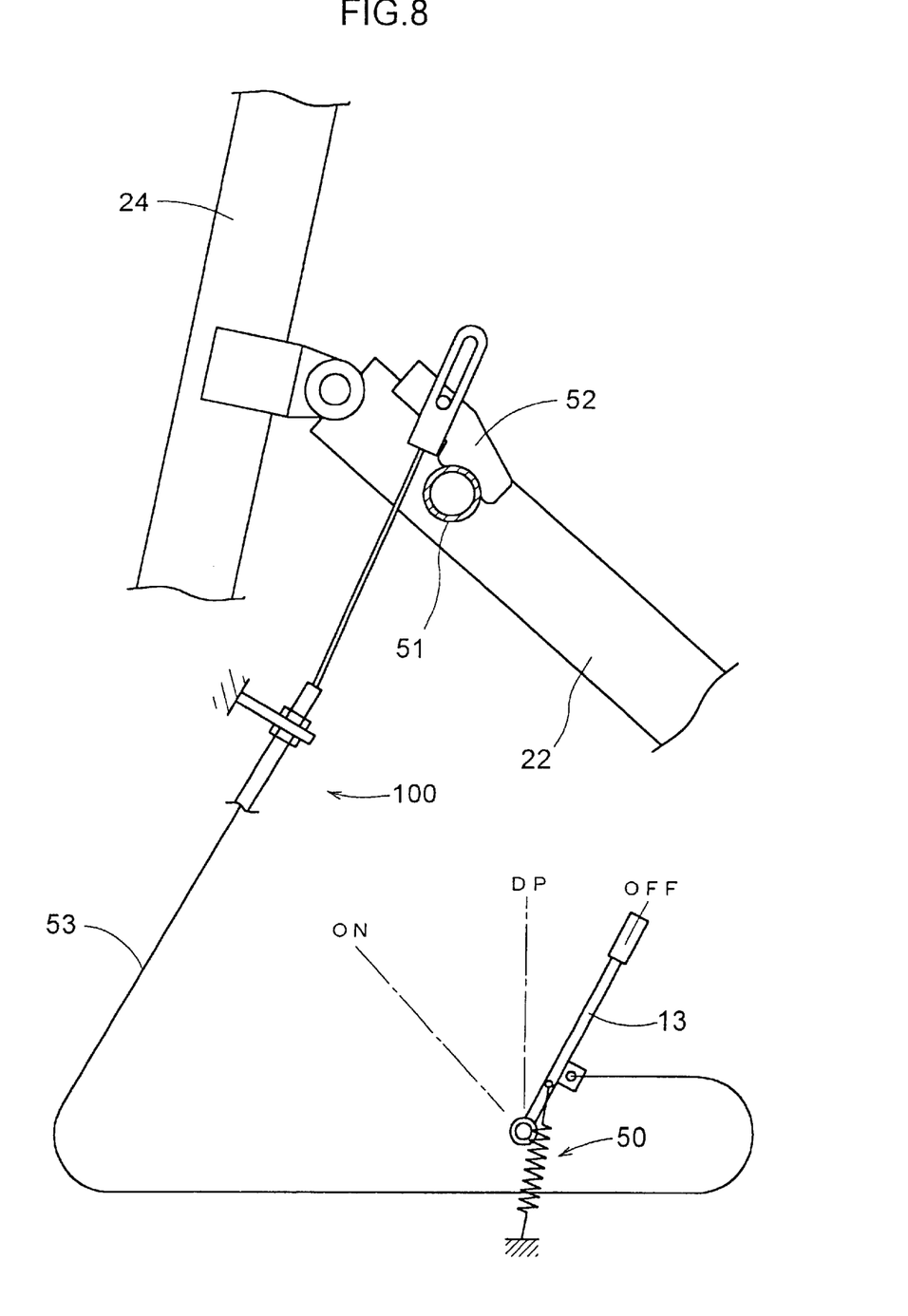
FIG. 8 is a side view showing the grass catcher in the collecting position, and a power cutoff mechanism in a clutch disengaging position, in a different embodiment.
Figure 9:
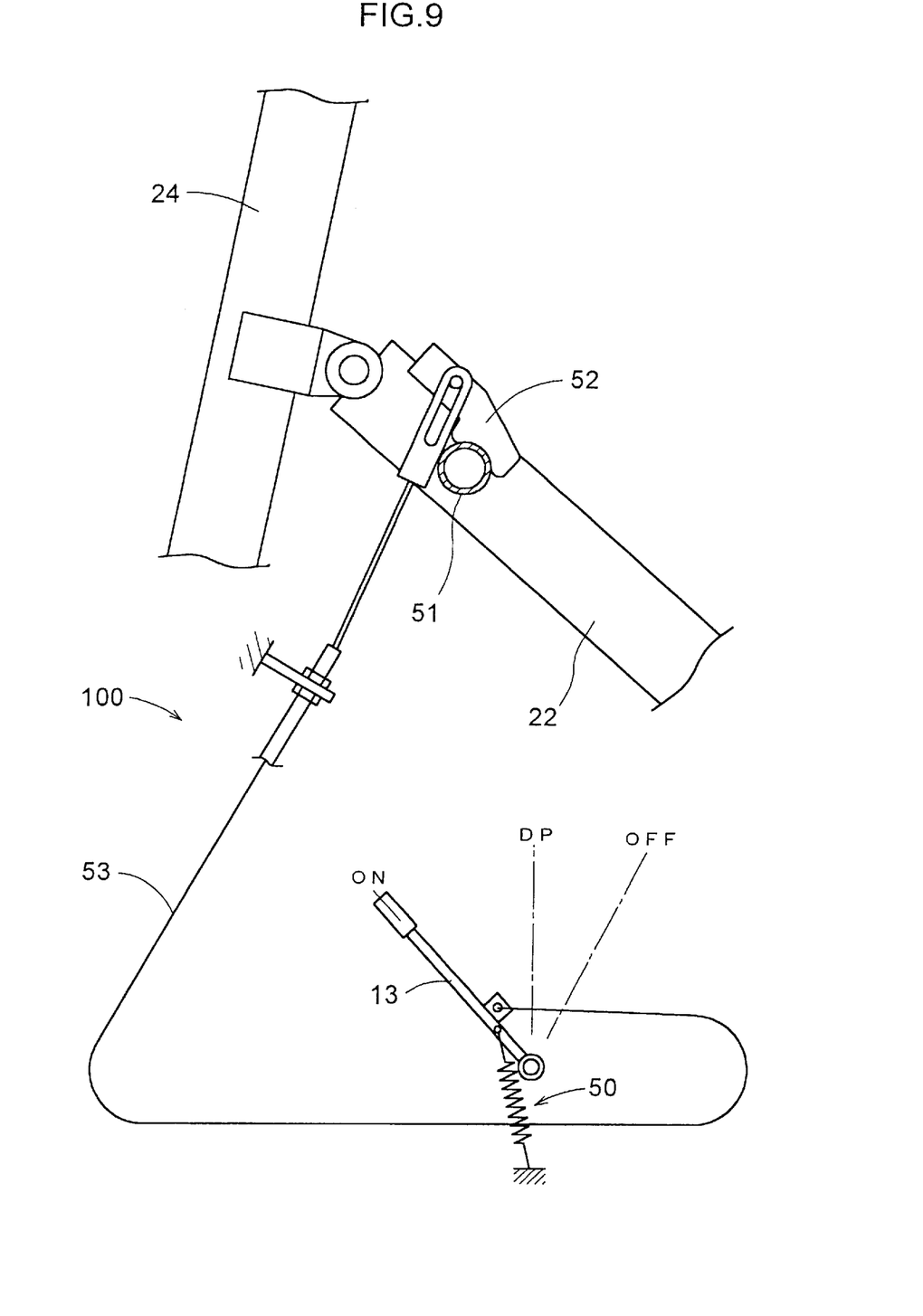
FIG. 9 is a side view showing the grass catcher in the collecting position, and the power cutoff mechanism in a clutch engaging position, in the different embodiment.
Figure 10:
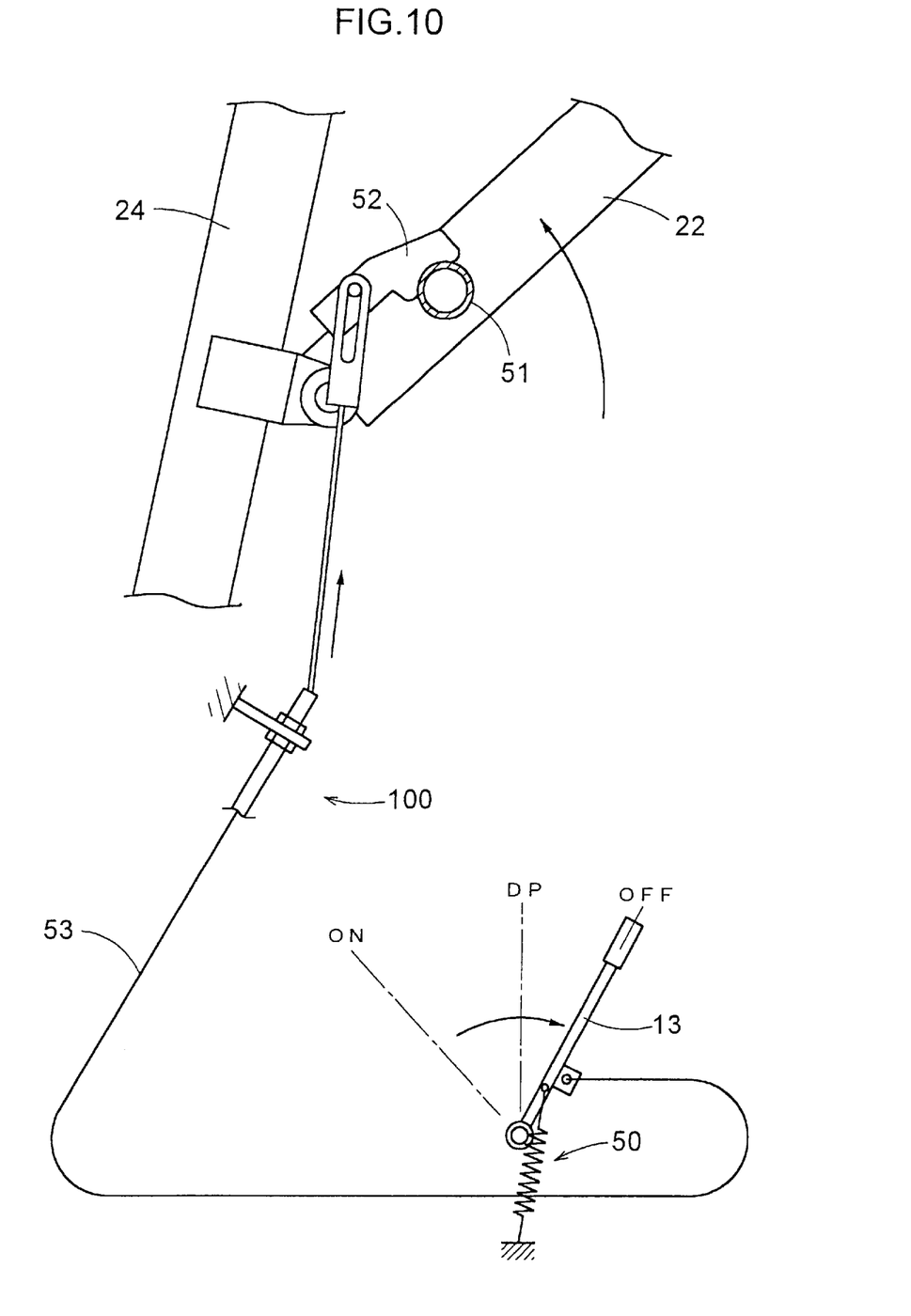
FIG. 10 is a side view showing the power cutoff mechanism in time of the grass catcher being raised.

FIGS. 8 through 10 show a modification of power cutoff mechanism 100 for preventing grass clippings and the like from being inadvertently discharged from the rear end opening of duct 17 when the grass catcher 6 is disconnected from the duct 17.

The link mechanisms 5 have a cross frame 51 disposed adjacent the proximal ends thereof for connecting the right and left lower links. The cross frame 51 has a control arm 52 fixed thereto and interlocked to the implement-operating clutch control lever 13 through a check wire 53. A play accommodating structure is provided to apply no restraint to the check wire 53 when the link mechanisms 5 are in the lower position to maintain the grass catcher 6 in the collecting position. In this state, the clutch control lever 13 may be operated freely.

When the implement-operating clutch control lever 13 is placed in the "clutch disengaging position", as shown in FIG. 8, the clutch control lever 13 may be operated freely since a play accommodating slot is formed in a connection between the check wire 53 and control arm 52.

When the implement-operating clutch control lever 13 is placed in the "clutch engaging position", as shown in FIG. 9, there is hardly any play in the connection between the check wire 53 and control arm 52. When the link mechanisms 5 move upward in this state, as shown in FIG. 10, the check wire 53 is pulled to switch the implement-operating clutch control lever 13 forcibly from the "clutch engaging position" to the "clutch disengaging position". Here, the check wire 53 acts as a main element of a displacement producing member for producing a control displacement in response to movement of the link mechanisms 5.

In this example also, a dead point DP is set to the middle position in the operating range of the clutch control lever 13. The clutch control lever 13 forcibly moved to the "clutch disengaging position" never moves to the "clutch engaging position" automatically even when the link mechanisms 5 are lowered back to the original position.

[Other Embodiments]

The device for automatically stopping the mower unit in response to the movement of grass catcher 6 from the collecting position toward the discharge position may be modified as follows:

(1) The implement-operating clutch may be an electromagnetic clutch for making and breaking power transmission to the mower unit 4. Then, a switch or suitable sensor may be used to detect a displacement of the detecting lever 42 or control arm 52 occurring with the movement of grass catcher 6 from the collecting position toward the discharge position, to switch off the electromagnetic clutch electrically.

(2) A switch or suitable sensor may be used to detect a displacement of the detecting lever 42 or control arm 52 occurring with the movement of grass catcher 6 from the collecting position toward the discharge position, to stop the engine 7.

(3) Where a displacement of detecting lever 42 is detected electrically by a switch or the like, the detecting lever 42 may directly contact the grass catcher 6 itself. When the grass catcher 6 moves from the collecting position, the detecting lever 42 may be swung by a biasing force. When the grass catcher 6 returns to the collection position, the detecting lever 42 may be swung against the biasing force.

What is claimed is:

1. A mowing machine comprising;
   a vehicle body;
   a mower unit connected to and supported by said vehicle body and having flow generating members driven by power supplied thereto for generating grass carrier air flows;
   a grass catcher disposed at a rear end of said vehicle body and defining an opening for receiving grass clippings;
   a grass transport duct for guiding grass clippings transported by the carrier air flows through said opening to said grass catcher;
   a vertical frame standing adjacent to said opening of said grass catcher to support said grass catcher;
   a link mechanism having a pivot adjacent an upper end of said vertical frame, said link mechanism swiveling, about said pivot, to raise/lower said grass catcher from/to a collecting position for connecting said opening of said grass catcher to said grass transport duct to/from a discharge position for separating said opening of said grass catcher from said grass transport duct; and a power cutoff mechanism for stopping power supply to said mower unit in response to the raise of said grass catcher from said collecting position to said discharge position caused by the swivel of said link mechanism about said pivot, said power cutoff mechanism including:

a clutch disposed in a power supply line to said mower unit;

a clutch control member shiftable between a clutch engaging position for causing said clutch to permit the power supply to said mower unit, and a clutch disengaging position for causing said clutch to stop the power supply to said mower unit;

a toggle mechanism provided at said clutch control member;

an arm member connected to said link mechanism adjacent said pivot, to be movable in response to the swivel of said link mechanism;

a wire member having one end connected to said clutch control member and the other end connected to said arm member; and     a lost motion mechanism defined in a region connecting said wire member and said arm member;

wherein when said grass catcher is in said collecting position, said lost motion mechanism allows the shift of said clutch control member between said clutch engaging position and said clutch disengaging position, wherein when said grass catcher is raised from said collecting position to said discharge position, said lost motion mechanism is overridden and said wire member forcibly shifts said clutch control member located in said clutch engaging position to said clutch disengaging position against the force of said toggle mechanism, and wherein when the raise of said grass catcher from said collecting position to said discharge position is completed, the entire grass catcher comes above said upper end of said vertical frame.

2. A mowing machine as defined in claim 1, wherein when said grass catcher is returned to said collecting position from said discharge position, said clutch control member is retained at said clutch disengaging position under the force of said toggle mechanism.

3. A mowing machine as defined in claim 1, wherein said lost motion mechanism is defined in said wire member.

4. A mowing machine as defined in claim 1, wherein said flow generating members of said mower unit are rotary blades for cutting grass.

5. A mowing machine comprising:

a vehicle body;

a mower unit connected to and supported by said vehicle body and having flow generating members driven by power supplied thereto for generating grass carrier air flows;

a grass catcher disposed at a rear end of said vehicle body, said grass catcher defining an opening for receiving grass clippings at a forward position thereof in a longitudinal direction of said vehicle body, and said grass catcher having a lid for discharging the grass clippings at a rearward position thereof in the longitudinal direction;

a grass transport duct for guiding grass clippings transported by the carrier air flows through said opening to said grass catcher;

a vertical frame standing forwardly of said grass catcher in the longitudinal direction to support said grass catcher;

a link mechanism having a pivot adjacent an upper end of said vertical frame, said link mechanism swiveling, about said pivot, to raise/lower said grass catcher from/to a collecting position for connecting said opening of said grass catcher to said grass transport duct to/from a discharge position for separating said opening of said grass catcher from said grass transport duct; and a first actuator having one end connected to a lower position of said vertical frame and the other end connected to said link mechanism, to effect the swivel of said link mechanism;

a second actuator having one end connected to said link mechanism and the other end connected to said lid of said grass catcher, to open/close said lid; and a power cutoff mechanism for stopping power supply to said mower unit in response to the raise of said grass catcher from said collecting position to said discharge position caused by the swivel of said link mechanism about said pivot, said power cutoff mechanism including:

a clutch disposed in a power supply line to said mower unit;

a clutch control member shiftable between a clutch engaging position for causing said clutch to permit the power supply to said mower unit, and a clutch disengaging position for causing said clutch to stop the power supply to said mower unit;

a toggle mechanism provided at said clutch control member;

an arm member connected to said link mechanism at a second pivot located adjacent said pivot of said link mechanism, to be pivotal about said second pivot in response to the swivel of said link mechanism;

a wire member having one end connected to said clutch control member and the other end connected to said arm member; and     a lost motion mechanism defined in said wire member in a region of connection between said wire member and said arm member;

wherein when said grass catcher is in said collecting position, said lost motion mechanism allows the shift of said clutch control member between said clutch engaging position and said clutch disengaging position, wherein when said grass catcher is raised from said collecting position to said discharge position, said lost motion mechanism is overridden and said wire member forcibly shifts said clutch control member located in said clutch engaging position to said clutch disengaging position against the force of said toggle mechanism, and wherein when the raise of said grass catcher from said collecting position to said discharge position is completed, said entire grass catcher comes above said upper end of said vertical frame by said first actuator, and subsequently said grass catcher is rotated with orienting said lid downward by said second actuator to discharge the grass clippings.

6. A mowing machine as defined in claim 5, wherein when said grass catcher is returned to said collecting position from said discharge position, said clutch control member is retained at said clutch disengaging position under the force of said toggle mechanism.

7. A mowing machine as defined in claim 5, wherein said flow generating members of said mower unit are rotary blades for cutting grass.

* * * * *